United States Patent [19]

Gumkowski et al.

[11] Patent Number: 4,560,037
[45] Date of Patent: Dec. 24, 1985

[54] SPRING FOR A DISC BRAKE

[75] Inventors: Bert A. Gumkowski; Roger W. Oltmanns, Jr., both of South Bend, Ind.

[73] Assignee: Allied Corporation, Morristown, N.J.

[21] Appl. No.: 682,582

[22] Filed: Dec. 17, 1984

Related U.S. Application Data

[63] Continuation of Ser. No. 450,504, Dec. 16, 1982, abandoned.

[51] Int. Cl.⁴ .................... F16D 55/224; F16D 65/04
[52] U.S. Cl. .............................. 188/73.38; 188/73.45
[58] Field of Search ................ 188/18 A, 72.3, 73.36, 188/73.37, 73.38, 73.39, 73.44, 73.45, 216; 192/30 V, 115

[56] References Cited

U.S. PATENT DOCUMENTS

| | | | |
|---|---|---|---|
| 3,887,044 | 6/1975 | Burgdorf et al. | 188/73.38 |
| 3,941,216 | 3/1976 | Burgdorf | 188/73.32 X |
| 4,004,658 | 1/1977 | Margetts et al. | 188/73.36 |
| 4,082,166 | 4/1978 | Ritsema | 188/73.32 |
| 4,196,794 | 4/1980 | Matsumoto | 188/73.37 |
| 4,214,649 | 7/1980 | Fujimori et al. | 188/73.38 |
| 4,245,723 | 1/1981 | Moriya | 188/72.3 |
| 4,274,514 | 6/1981 | DuCharme et al. | 188/73.44 |

FOREIGN PATENT DOCUMENTS

| | | | |
|---|---|---|---|
| 41450 | 12/1981 | European Pat. Off. | 188/72.3 |
| 2804619 | 8/1979 | Fed. Rep. of Germany | 188/73.38 |
| 56-167925(A) | 12/1981 | Japan | 188/73.37 |
| 2013803 | 8/1979 | United Kingdom . | |

*Primary Examiner*—Bruce H. Stoner, Jr.
*Assistant Examiner*—Richard R. Diefendorf
*Attorney, Agent, or Firm*—Larry J. Palguta; Ken C. Decker

[57] ABSTRACT

A spring for a disc brake wherein a caliper cooperates with a pair of friction elements to engage the latter with a rotor during braking. A torque member carries the caliper relative to the rotor and opposes movement of the pair of friction elements with the rotor. The spring extends from the caliper to one of the pair of friction elements to releasably attach the latter to the caliper and also bias the one friction element into a substantially anti-rattle abutment with the torque member whereby rattling noises for the one friction element are reduced or eliminated.

1 Claim, 4 Drawing Figures

SPRING FOR A DISC BRAKE

This is a continuation of Application Ser. No. 450,504 filed Dec. 16, 1982, now abandoned.

This invention relates to a spring for a disc brake wherein a caliper cooperates with a pair of friction elements to urge the latter into engagement with a rotor to be braked. A torque member movably supports the caliper and opposes the pair of friction elements to absorb braking torque developed when the pair of friction elements are engaged with the rotor.

In order to attach the pair of friction elements to the caliper when the latter is separate from the torque member and rotor, it has been proposed to utilize a spring extending from an outer friction element to the caliper and a clip extending from an inner friction element to a piston carried by the caliper. With the clip and spring, it is possible to attach the inner and outer friction elements to the caliper for shipping to a destination where the caliper will be assembled with a torque member and rotor so that the friction elements fit on opposite sides of the rotor.

The prior art is illustrated by U.S. Pat. No. 4,082,166.

When the caliper is assembled to the torque member, the outer friction element will be positioned in abutment with the torque member so that torque developed by the outer friction element, as well as the inner friction element, will be transferred to the torque member. In order to easily attach the caliper and friction elements to the torque member, there are clearances provided. However, these clearances with respect to the outer friction element result in rattle noises. It is desirable to eliminate or reduce these noises in the absence of further parts or major modifications to the disc brake.

The present invention provides a spring for a disc brake wherein a pair of brake shoes are urged into engagement with a rotor by a caliper during braking and a torque member movably supports the caliper assembly and opposes the pair of friction elements to prevent rotation of the latter with the rotor, and the spring is engageable with one of the pair of friction elements and the caliper to yieldably oppose separation therebetween, characterized by said spring further cooperating with said caliper and said one friction element to bias the latter in one direction into a substantially anti-rattle abutment with said torque member.

It is an advantage of the present invention that an existing spring for attaching the outer friction element to the caliper is slightly modified to substantially reduce rattle for the outer friction element. In addition, only minor alterations are required for the caliper to provide an abutment surface engageable with the spring.

The invention will now be described with reference to the accompanying drawings wherein.

Figure 1:
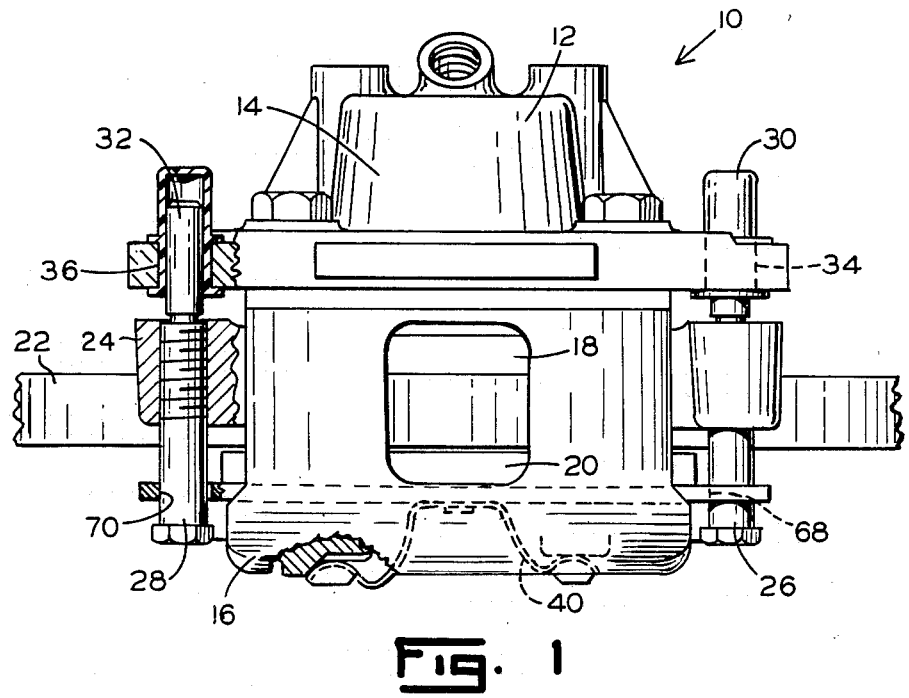
FIG. 1 is a top view of a disc brake.
Figure 2:
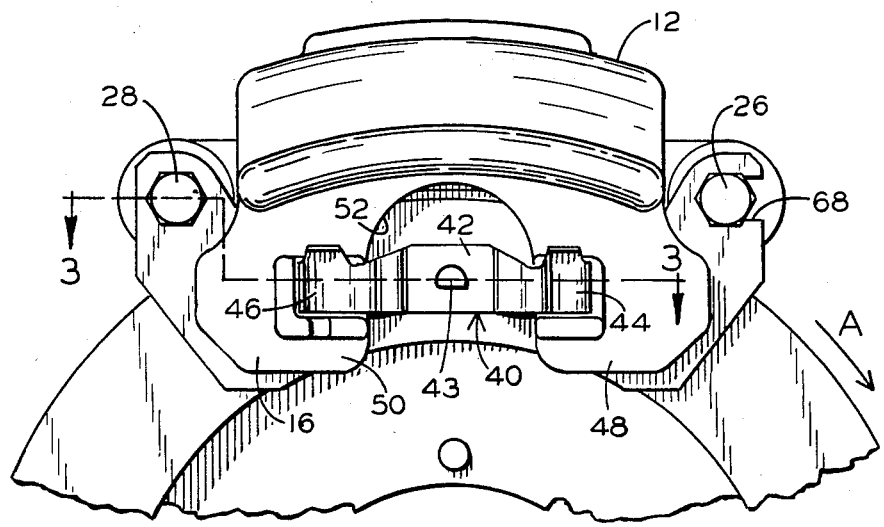
FIG. 2 is a side view of the brake shown in FIG. 1.

A disc brake 10 includes a caliper 12 with a hydraulic actuator portion 14 and a reaction portion 16. The caliper 12 cooperates with a pair of brake shoes 18 and 20 to urge the latter into engagement with a rotor 22 in a conventional manner by moving friction element 18 directly into engagement with the rotor so that the caliper moves relative to the rotor to engage friction element 16 therewith. In order to movably support the caliper relative to the rotor, a torque member 24 is fixedly disposed adjacent the rotor. The torque member includes a pair of pins 26 and 28 with ends 30 and 32 extending through caliper openings 34 and 36 via suitable bushings so that the caliper slides on the ends 30 and 32.

The inner friction element 18 is releasably attached to a piston (not shown) of the hydraulic actuator portion 14 via a clip (not shown) or other attaching means. The outer friction element 20 is releasably attached to the reaction portion 16 of the caliper by a plate spring 40. The plate spring 40 includes a central portion 42 secured to friction element 20 via an extrusion 43 and a pair of arms 44 and 46. The arm 44 resiliently engages a caliper leg 48 and the arm 46 resiliently engages a caliper by 50 in a manner hereinafter described. The legs 48 and 50 form a recess or opening 52 through which the arms 44 and 46 extend.

Figure 3:
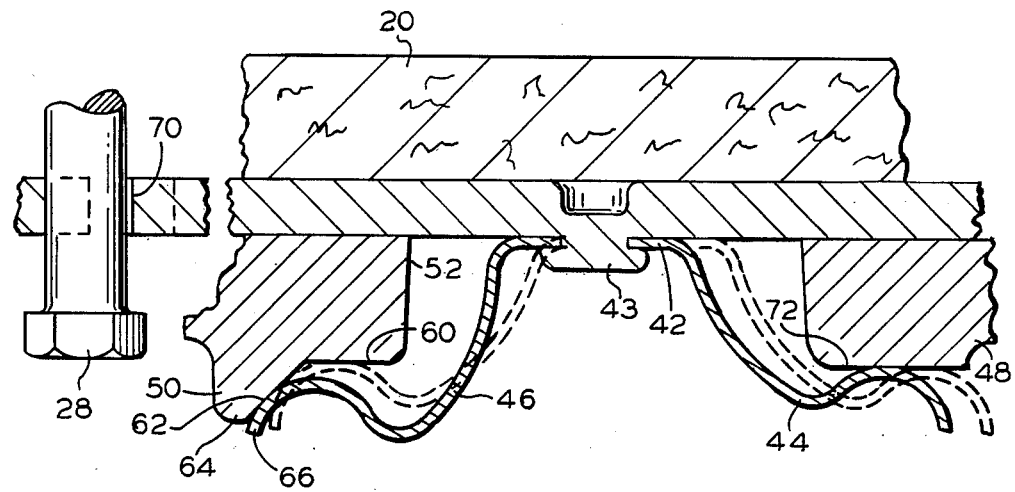
FIG. 3 is an enlarged cut away view of the encircled portion in FIG. 1.

The leg 50 defines a flat surface 60 adjoining a tapered surface 62 which is formed by an outwardly extending boss 64 on the leg 50. The plate spring arm 46 includes an arcuate end 66 forming a half circle substantially. As shown in dotted line in FIG. 3, the end 66 is engageable with the flat surface 60 and the tapered surface 62 when the caliper and pair of brake shoes are separate from the torque member. When the caliper 12 is assembled to the torque member, the pins 26 and 28 extend through a slot 68 and an opening 70, respectively, formed on the outer friction element. In this position, the spring arm is deflected as shown in solid lines in FIG. 3 so that the arcuate end is moved to a position spaced from the flat surface 60 and solely engaging the tapered surface 62. The arm 44 remains in engagement with a substantially flat surface 72 formed on the caliper leg 48. In response to the engagement between the end 66 and the tapered surface 62, the spring 40 is biased to move in the direction A corresponding to the direction of rotation for the rotor at the caliper. Consequently, the spring 40 and outer friction element are moved in the direction A to contact the wall of opening 70 with the outer surface of pin 28 and resiliently retain the wall in contact with the pin even when the caliper is vibrating during vehicle operation. Therefore, any vibration between the outer friction element and the pin is substantially eliminated to, in turn, substantially eliminate rattling noises by the outer friction element.

Figure 4:
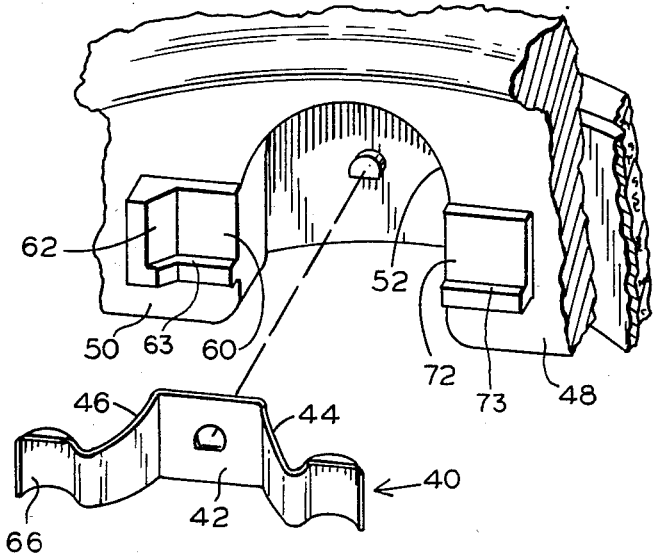
FIG. 4 is a partially exploded view of the spring and friction element.

FIG. 4 illustrates axial shelves 63 and 73 which extend axially from flat surfaces 60, 72, respectively, and prevent the arms 44, 46, and friction element 20 from being moved radially inwardly away from recess or opening 52, the tapered surface 62 and shelves 63, 73 defining a pocket for capturing the arms 44,46.

In view of the foregoing description, it is seen that the spring 40 needs only a slight modification at the end 66 and the caliper requires a tapered surface to provide for the anti-rattle feature described for the outer friction element 20.

We claim:

1. A disc brake comprising a caliper cooperating with a pair of friction elements to urge the latter into engagement with a rotor to be braked, a torque member opposing the pair of friction elements and movably supporting the caliper, the caliper defining a hydraulic actuator for receiving fluid pressure during braking and a reaction portion opposite the hydraulic actuator and engageable with one of the pair of friction elements, and a dual purpose spring extending between the reaction portion and the one friction element to provide anti-rattle engagement and to retain the one friction element in engagement with the caliper even when the caliper is separate from the torque member, the reaction portion forming a pair of legs with an opening therebetween so that the spring extends through the opening with a pair of arms engagable respectively with the pair of legs, one of the legs engaging directly one of the arms to provide lateral loading in one direction parallel to a plane of rotation for the rotor so that when the caliper is assembled to the torque member the one friction element is biased by the spring into a substantially anti-rattle engagement therewith, the one leg of the caliper being provided with an axially tapered extension with an exterior surface forming a ramp and the one arm of the spring being provided with an arcuate end engaging directly the ramp of the axially tapered extension to generate the lateral loading for the spring and the one friction element, the axially tapered extension including an axially extending portion forming an axial shelf, and the other of the legs including an axially extending portion forming another axial shelf, the ramp and shelves defining a pocket that captures the arms of the spring to retain the one friction element in engagement with the caliper.

* * * * *